W. H. STOUT.
WIND SHIELD CLEANER AND SIGNAL FOR AUTOMOBILES.
APPLICATION FILED NOV. 8, 1916.

1,254,289.

Patented Jan. 22, 1918.
2 SHEETS—SHEET 1.

Witness
CMBeale.
W. F. Davidson

Inventor
W. H. Stout.
By
Attorney

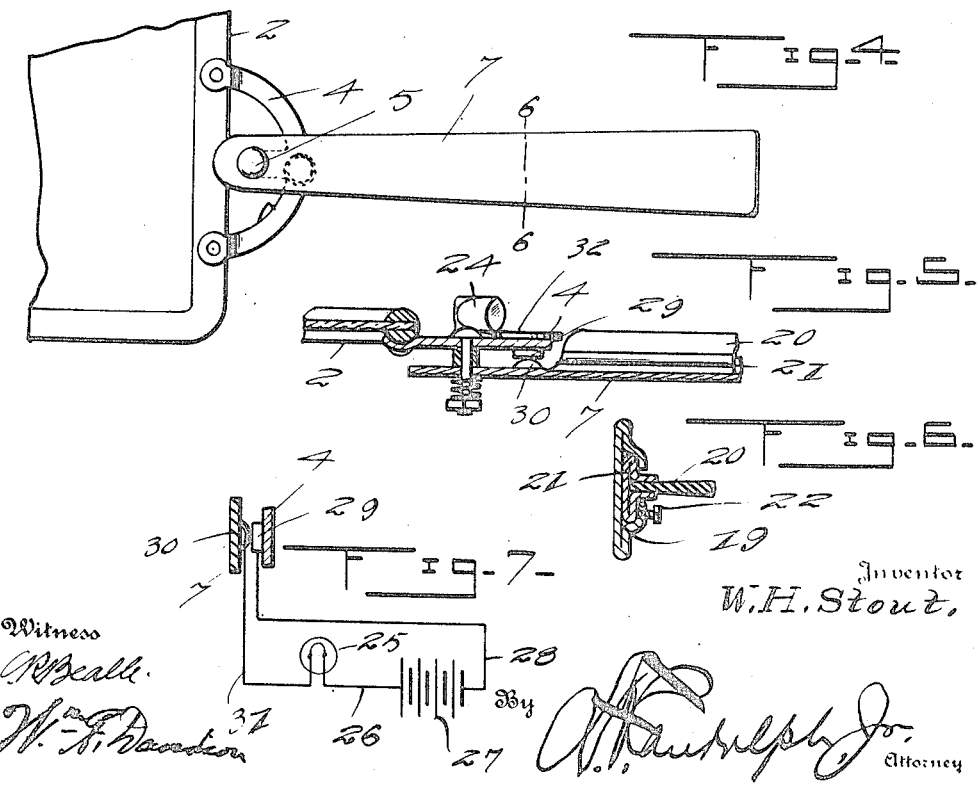

UNITED STATES PATENT OFFICE.

WILLIAM H. STOUT, OF BALTIMORE, MARYLAND.

WIND-SHIELD CLEANER AND SIGNAL FOR AUTOMOBILES.

1,254,289.      Specification of Letters Patent.      Patented Jan. 22, 1918.

Application filed November 8, 1916. Serial No. 130,138.

*To all whom it may concern:*

Be it known that I, WILLIAM H. STOUT, a citizen of the United States, residing at Baltimore, Maryland, have invented certain new and useful Improvements in Wind-Shield Cleaners and Signals for Automobiles; and I do hereby declare the following to be a full, clear, and exact description of the invention, such as will enable others skilled in the art to which it appertains to make and use the same.

This invention relates to a windshield cleaner and a direction signal and has for its primary object the provision of a pivoted member adapted to normally maintain a vertical position and which may be readily swung to a horizontal position in one direction to indicate to the traffic that a turn from a straight course is contemplated and which may be readily swung in an opposite direction to a horizontal position to clean a windshield of foreign matter that might be thereon.

A further object of this invention is to provide an operating means for manipulating the arm, which may be readily operated by either hand of a person.

A still further object of this invention is to provide a windshield cleaner and signal for automobiles, of the above stated character, which shall be simple, durable and efficient, and which may be manufactured and sold at a comparatively low cost.

With these and other objects in view as will become more apparent as the description proceeds, the invention consists in certain novel features of construction, combination and arrangement of parts as will be hereinafter more fully described, and claimed.

For a complete understanding of my invention, reference will be had to the following description and accompanying drawings, in which:—

Figure 1:
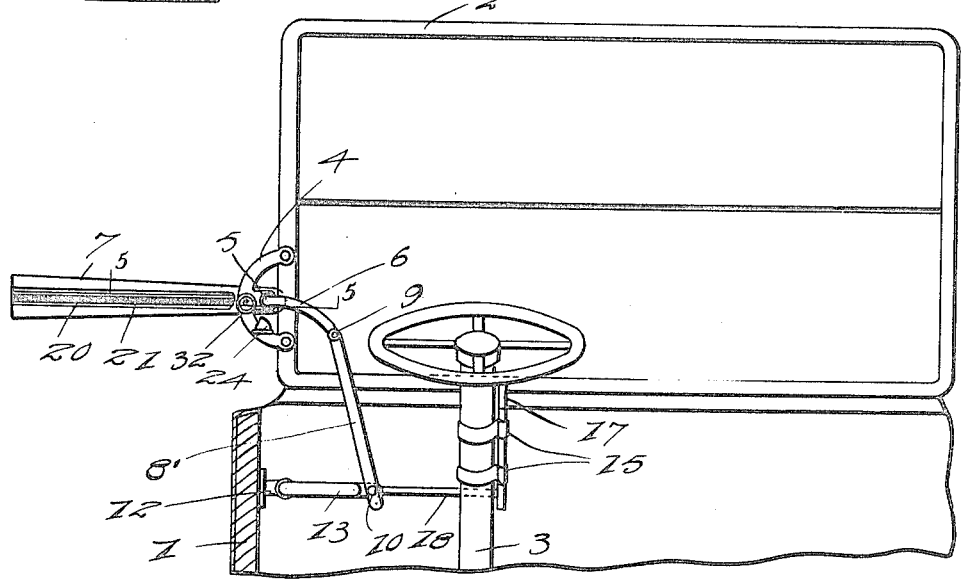
Figure 2:
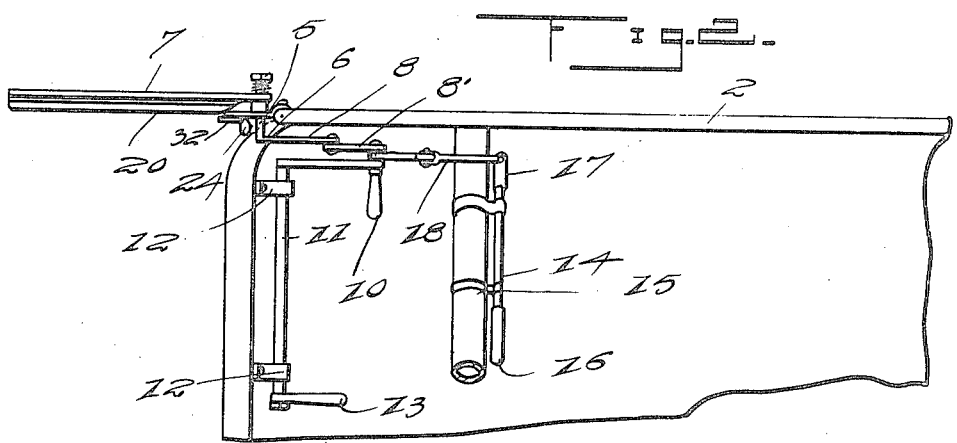
Figure 3:
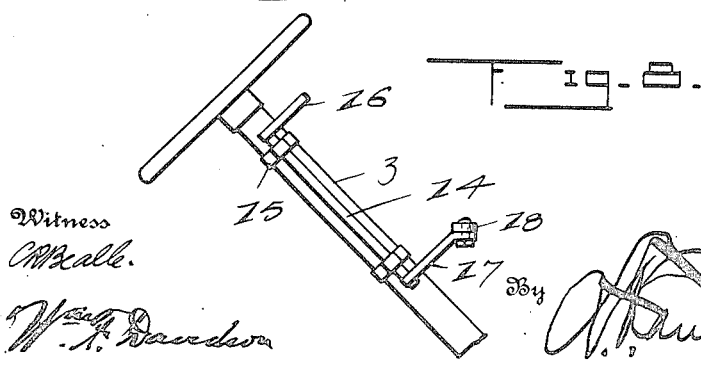

Figure 1 is a fragmentary elevation partly in section of an automobile and windshield illustrating my invention applied thereto, Fig. 2 is a fragmentary top plan view of the same, Fig. 3 is a fragmentary elevation of an automobile and windshield illustrating the novel position of the arm, Fig. 4 is a front elevation of the arm illustrating the means for securing it to the windshield, Fig. 5 is a fragmentary longitudinal sectional view taken on the line 5—5 of Fig. 1, Fig. 6 is a transverse sectional view taken on the line 6—6 of Fig. 4, illustrating the means of securing the cleaner to the arm, Fig. 7 is a diagrammatical view of a wiring diagram for illuminating the electric lamps, Fig. 8 is a detail elevation of a steering post illustrating an operating means thereon.

Referring in detail to the drawings, the numeral 1 indicates as an entirety, an automobile body having the usual windshield 2 mounted thereon and 3 a steering post of the ordinary steering mechanism of an automobile. The foregoing description relates to a well known construction of an automobile and to which my invention is applied.

A substantially U-shaped bracket 4 is bolted or otherwise secured to the windshield 2 as illustrated in Fig. 1 and is apertured to receive one arm portion 5 of a substantially L-shaped arm 6 on which is secured a signaling arm 7. One arm portion 8 of the substantially L-shaped arm 6 is curved downwardly as illustrated in Fig. 2 and extends rearwardly of the windshield and has pivotally secured thereto, a rod 8' as illustrated at 9. A handle 10 is secured to the lower end of the rod 8' and is pivoted thereto, a substantially L-shaped operating rod 11, which is journaled to the side of the automobile by brackets 12. A suitable handle 13 is secured to the ends of the operating rod 11 for rotating the same within the clamps 12.

An operating rod 14 is rotatably secured to the steering posts 3 by clamps 15 and has secured to its upper end, a handle 16 for turning the same within the clamps 15. The lower end of the operating rod 14 is bent at right angles as illustrated at 17 and has pivotally secured thereto, a link 18 which is in turn pivotally connected to the handle 10, whereby, the signaling arm 7 may be swung to a horizontal position as illustrated in Fig. 1 by either of the operating rods 11 or 14.

The signaling arm 7 has a longitudinal groove 19 formed therein for receiving a strip of rubber 20 forming a cleaner. The strip of rubber 20 is bound by a metallic strip 21 and is so formed or shaped as to be slidably received within the longitudinal groove 19 and is held therein by a plurality of set screws 22. A coil spring is located upon the arm portion 5 of the substantially L-shaped arm 6 and bears against the signaling arm 7 as clearly illustrated in Fig. 2. In operation, when desiring to clean the windshield of foreign matter thereon, by pushing downwardly upon either of the handles 13 or 16, the signaling arm 7 is forced to swing across the glass of the windshield 2, the rubber cleaner 20 engaging the glass and removing all foreign matter which may be upon the glass. By moving either of the handles in an opposite direction, the signaling arm 7 is moved to a substantially vertical position as illustrated in Fig. 3 and the normal position maintained by said arm. By giving either of the handles a quick movement, the signaling arm will be swung into a horizontal position or a position at right angles to the car so as to notify the traffic that a turn from a straight course is contemplated as clearly illustrated in Fig. 1. When cleaning the windshield and if the sweep of the signaling arm 7 with the cleaner is not sufficiently long enough to clean approximately the whole windshield, the rubber cleaner 20 may be extended outwardly of the longitudinal slot 19, by releasing the tension of the set screws 22 so as to give a longer sweep to the signaling arm, thus, approximately cleaning the entire length of the windshield. A reflector 24 is mounted upon the substantially U-shaped bracket 4 and has mounted therein an electric lamp 25, which has a conductor 26 connected thereto and which is in turn connected to a storage battery 27. A conductor 28 is connected in the storage battery and to a contact point 29, located upon the substantially U-shaped bracket 4. A contact 30 is carried by the signaling arm 7 and is connected to the electric lamp by a conductor 31 whereby, when the signaling arm 7 is swung to a horizontal position, or a signaling position as illustrated in Fig. 1, the contacts will engage each other and complete an electric circuit to the electric lamp 25, thereby illuminating the signaling arm so that the signal will be visible at night.

A mirror 32 is secured to the bracket 4 for the purpose of reflecting the rays of light from the electric lamp rearwardly of the automobile, so that the attention of the traffic will be readily attracted thereby.

While I have shown and described the preferred embodiment of my invention, it will be understood that minor changes in construction, combination and arrangement of parts may be made without departing from the spirit and scope of the invention as claimed.

Having thus described my invention, what I claim is:—

1. A device of the character set forth comprising a member pivoted to a windshield, a cleaner carried by said member, means for swinging the member in a horizontal position in either direction to act as a signal when in one horizontal position and to act as a cleaner when in the other horizontal position.

2. A device of the character set forth comprising a member pivoted to a windshield and normally retaining a vertical position, a cleaner adjustably secured to the member, and means for swinging the member in a horizontal position in either direction to act as a signal when in one horizontal position and act as a cleaner when in the other horizontal position.

3. A device of the character set forth comprising a bracket, means for securing the bracket to a windshield, an arm journaled in said bracket, a signaling arm carried by said arm and normally retaining a vertical position, a cleaner secured to said signaling arm, and means connected with the first mentioned arm for swinging the signaling arm in a horizontal position in either direction to act as a signal when in one horizontal position and to act as a cleaner in the windshield when moving in the other horizontal position.

4. A device of the character set forth comprising a substantially U-shaped bracket secured to the windshield, a substantially L-shaped arm journaled in said bracket, a signaling arm carried by said L-shaped arm and normally maintaining a vertical position, a cleaner adjustably secured to the signaling arm, a rod pivoted to the L-shaped arm, and an operating rod connected to the said rod for swinging the signaling arm in a horizontal position in either direction to act as a signal when in one horizontal position and to clean the windshield when moving into the other horizontal position.

5. A device of the character set forth comprising a bracket secured to a windshield, a signaling arm pivoted to said bracket and normally maintaining a vertical position, an electric lamp carried by said bracket, a cleaner carried by said arm, and means for swinging the signaling arm into a horizontal position in either direction for acting as a signal when in one horizontal position and to act as a cleaner for the windshield when in the other horizontal position, and means for automatically illuminating the lamp when the signaling arm is moved into a signaling position.

6. A device of the character set forth comprising a bracket secured to a windshield, a substantially L-shaped arm journaled in said bracket, a signaling arm carried by said L-shaped arm and normally maintaining a vertical position, a coil spring carried by said L-shaped arm and bearing against said signaling arm, said signaling arm having a longitudinal groove, a rubber cleaner adjustably secured in said groove, one arm portion of the L-shaped arm being curved downwardly, a rod pivoted to the curved end of the L-shaped arm, a pair of operating rods operatively connected with said rod to swing the signaling arm into horizontal position in either direction to act as a signal when in one horizontal position and to act as a cleaner when moving into the other horizontal position.

In testimony whereof I affix my signature in presence of two witnesses.

WILLIAM H. STOUT.

Witnesses:
W. H. SCHAEFER,
J. EDWARD CUSTY.